US008667251B2

(12) United States Patent  
Lafi et al.

(10) Patent No.: US 8,667,251 B2  
(45) Date of Patent: Mar. 4, 2014

(54) ELECTRONIC CHIP AND INTEGRATED CIRCUIT INCLUDING A SPLIT ROUTING UNIT HAVING FIRST-LEVEL ROUTERS FOR INTRA-LAYER TRANSMISSIONS AND SECOND-LEVEL ROUTERS FOR INTER-LAYER TRANSMISSIONS AND TRANSMISSIONS TO THE PROCESSING UNITS

(75) Inventors: Walid Lafi, Saint-Martin d'Heres (FR); Didier Lattard, Rencurel (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 393 days.

(21) Appl. No.: 13/027,613

(22) Filed: Feb. 15, 2011

(65) Prior Publication Data

US 2011/0264890 A1 Oct. 27, 2011

(30) Foreign Application Priority Data

Mar. 2, 2010 (FR) ...................................... 10 51517

(51) Int. Cl.  
*G06F 15/00* (2006.01)

(52) U.S. Cl.  
USPC .......................................................... 712/11

(58) Field of Classification Search  
USPC .......................................................... 712/11  
See application file for complete search history.

(56) References Cited

PUBLICATIONS

Kim et al. "A Novel Dimensionally-Decomposed Router for On-Chip Communication in 3D Architectures". May 2007. 12 pages.*

Feihui Li, et al., "Design and Management of 3D Chip Multiprocessors Using Network-in-Memory", Computer Architecture, 33RD, International Symposium on Boston, IEEE LNKD-DOI:10.1109/ISCA, XP010925387, Jun. 2006, 12 pages.

Vasilis F. Pavlidis, et al., "3-D Topologies for Networks-on-Chip", IEEE Transactions on Very Large Scale Integration (VLSI) Systems, vol. 15, No. 10, Oct. 2007, pp. 1081-1090.

French Preliminary Search Report issued Oct. 19, 2010, in French 1051517, filed Mar. 2, 2010 (with English Translation of Categories of Cited Documents).

"MIRA: A-Multi-Layered On-Chip Interconnect Router Architecture" D. Park et al.; International Symposium on Computer Architecture, pp. 251-261, Jun. 2008.

* cited by examiner

*Primary Examiner* — Robert Fennema  
(74) *Attorney, Agent, or Firm* — Oblon, Spivak, McClelland, Maier & Neustadt, L.L.P.

(57) ABSTRACT

This electronic chip includes functional modules each including a single processing unit and a single routing unit (110E) connected to one another, and connections, called routing connections, each of which has at least one end connected to the routing unit of a functional module, where the routing connections connect between themselves the routing units of the functional modules so as to allow routing of data between the processing units of the functional modules.

The routing unit (110E) of at least one functional module, called a split routing unit, includes two routers (112E, 114E), called respectively a first-level router and a second-level router, which are connected to one another, where the first-level router is moreover connected to at least two routing connections, and where the second-level router is moreover connected to the processing unit of this functional module and connected to at least one other routing connection.

11 Claims, 3 Drawing Sheets

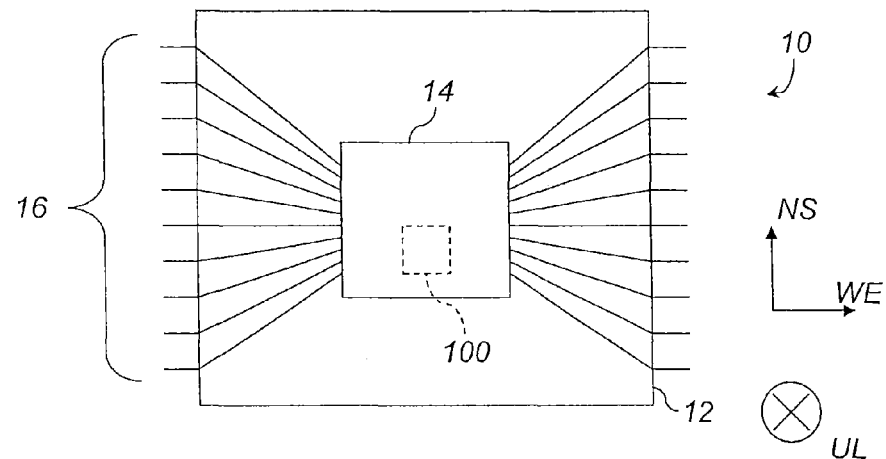
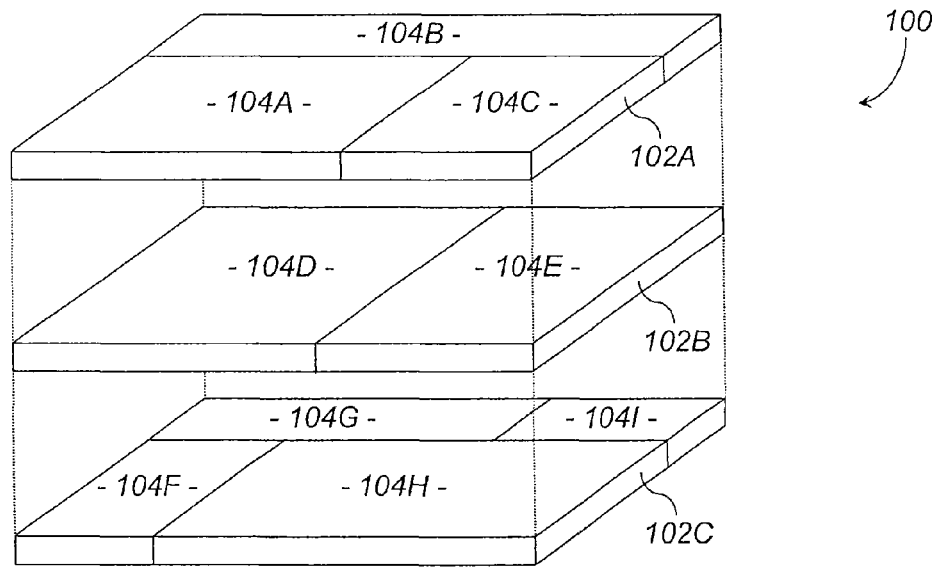

ELECTRONIC CHIP AND INTEGRATED CIRCUIT INCLUDING A SPLIT ROUTING UNIT HAVING FIRST-LEVEL ROUTERS FOR INTRA-LAYER TRANSMISSIONS AND SECOND-LEVEL ROUTERS FOR INTER-LAYER TRANSMISSIONS AND TRANSMISSIONS TO THE PROCESSING UNITS

The present invention concerns an electronic chip and an integrated circuit including such an electronic chip. It applies in particular to the field of microprocessors.

The following definitions will be used in the description and the claims which follow.

An "electronic chip" is a small element of semiconducting material in which a given electronic circuit is designed. An electronic chip may be made from a single block of semiconducting material, or from several. In the latter case these blocks are generally stacked one on top of another, to form several layers of the electronic chip.

An "integrated circuit" is an electronic chip which has been encapsulated in a carrier fitted with connection pins allowing, when connected to a circuit of electronic components, for example on a printed circuit card, the electronic chip to be connected to these other components.

The article entitled "MIRA: A multi-layered on-chip interconnect router architecture", by D. Park et al, published in 35*th International Symposium on Computer Architecture*, 2008, ISCA '08, June 2008, describes an electronic chip including functional modules each including a single processing unit.

In this article the electronic chip is in three dimensions and includes several superimposed layers of functional modules (the layers will be called "planes" in the remainder of the document, when the functional modules will be considered from a network standpoint). It is proposed in this document that the processing units of functional modules of different layers located vertically relative to one another should all be connected to a single common router. It is further proposed that the elements of this common router should be distributed over the different layers. This architecture has the disadvantage that it cannot be accomplished in practice with the current technologies for integrating electronic chips in three dimensions.

Furthermore, the article entitled "Design and management of 3D chip multiprocessors using network-in-memory", by F. Li et al, published in *Proceedings of ISCA*-33, June 2006, describes an electronic chip including functional modules, each including a single processing unit and a single routing unit, connected to one another, where the routing units of the functional modules are connected to one another so as to allow routing of data between the processing units of the functional modules.

In this article the electronic chip is in three dimensions and includes several superimposed layers of functional modules. The routing unit of each functional module includes a single router for communication in the layer. Moreover, the electronic chip includes several vertical data buses, where each data bus links the routers of different layers located vertically relative to one another. The routers therefore have six bidirectional connections (four connections to other routers in the same plane, one connection to the processing unit and one connection to the vertical data bus) instead of seven connections which would have been required if the data bus had not been present. However, this architecture has the disadvantage that a data bus can be traversed only by a single data group at any one time. Thus, if there are many data exchanges between the layers the vertical data buses easily become saturated.

Furthermore, the article entitled "novel dimensionally-decomposed router for on-chip communication in 3D architectures", by J. Kim et al, published in *ACM SIGARCH Computer architecture news*, vol. 35, pages 138-149, May 2007, describes an electronic chip including functional modules, each including a single processing unit and a single routing unit, connected to one another, where the routing units of the functional modules are connected to one another so as to allow routing of data between the processing units of the functional modules.

In this article the electronic chip is in three dimensions and includes several superimposed layers of functional modules. The network of functional modules constituted in this manner is a lattice network in three dimensions, in which each functional module is connected to at most four neighbouring functional modules in its layer, and also, if applicable, to a neighbouring functional module located in the layer above, and a neighbouring functional module located in the layer below. The four neighbouring functional modules in the plane are traditionally called North, South, East and West, and the two functional modules above and below are called Upper and Lower, according to their position relative to the functional module in question.

In this article the routing unit of each functional module consists of a single router including three crossbars, instead of a single crossbar for a habitual router. The first crossbar is dedicated to East/West routing, the second crossbar to North/South routing, and the third crossbar to Upper/Lower routing. The purpose of this division between several crossbars is to improve the performance of the router and to reduce its area. This article also proposes to use the XYZ deterministic routing algorithm, which has the advantage that it requires only two arbitration steps. If another routing algorithm were used it could require more arbitration steps due to the presence of the three crossbars. And a number of arbitration steps greater than two could reduce, or even cancel out, the gain in performance obtained through the use of three crossbars. Thus, the electronic chip proposed in this article has the disadvantage that it guarantees satisfactory performance only with a single routing algorithm.

It may thus be desired to envisage an electronic chip which enables at least a part of the abovementioned problems and constraints to be overcome.

An object of the invention is thus an electronic chip including functional modules, each including a single processing unit and a single routing unit connected to one another, and connections, called routing connections, each of which has at least one end connected to the routing unit of a functional module, where the routing connections connect between themselves the routing units of the functional modules so as to allow a routing of data between the processing units of the functional modules, an electronic chip in which the routing unit of at least one functional module, called a split routing unit, includes two routers, respectively called the first-level router and the second-level router, which are connected one to another, and where the first-level router is moreover connected to at least two routing connections, and where the second-level router is moreover connected to the processing unit of this functional module and connected to at least one other routing connection.

The invention thus proposes to design the routing unit with several small-size routers, i.e. using several routers individually including a number of connections less than the number of connections of the routing unit. Thus, when data is conveyed through the split routing unit between two routing connections connected to the first-level router, this data traverses only the first-level router. And, since this first-level router is small in size, this data can traverse the split routing unit with a high transmission rate and a low latency.

Optionally, the electronic chip includes several functional modules, each having a split routing unit.

Also optionally, the first-level routers form at least one network, called a first-level network, in which the first-level routers are connected to one another.

Also optionally, the first-level routers form several first-level networks and the electronic chip includes at least one pair of split routing units, the first-level routers of which belong to different first-level networks, and the respective second-level routers of which are connected to one another.

Also optionally, the second-level routers form at least one network, called the second-level network, in which the second-level routers are connected to one another.

Also optionally, the electronic chip includes several layers of functional modules.

Also optionally, each layer includes a separate first-level network.

Also optionally, the electronic chip includes at least one pair of split routing units, the first-level routers of which belong to first-level networks of different layers, and the respective second-level routers of which are connected to one another.

Also optionally, each first-level network is a lattice network. In this case, several functional modules can have a split routing unit, and have their first-level router connected only to their second-level router and to the four first-level routers of four neighbouring functional modules in their layer, and their second-level router connected only to their first-level router, to their processing unit, and to the two second-level routers of two neighbouring functional modules, respectively, of the layer above and of the layer below their layer.

Thus, in a three-dimensional electronic chip according to the invention, the first-level routers are dedicated to intra-layer transmissions, and the second-level routers to the inter-layer transmissions and to the final transmission of the data to the processing units.

Another object of the invention is an integrated circuit including a carrier, an electronic chip as previously defined set in the carrier, and connecting pins traversing the carrier and connected to the electronic chip.

BRIEF DESCRIPTION OF THE SEVERAL VIEWS OF THE DRAWINGS

The invention will be better understood by means of the following description, given solely as an example, and made in reference to the appended illustrations, in which:

FIG. 1 is a diagram representing an integrated circuit according to an embodiment of the invention, FIG. 2 is an exploded perspective view of a part of an electronic chip of the integrated circuit of FIG. 1.

DETAILED DESCRIPTION OF THE INVENTION

Figure 3:
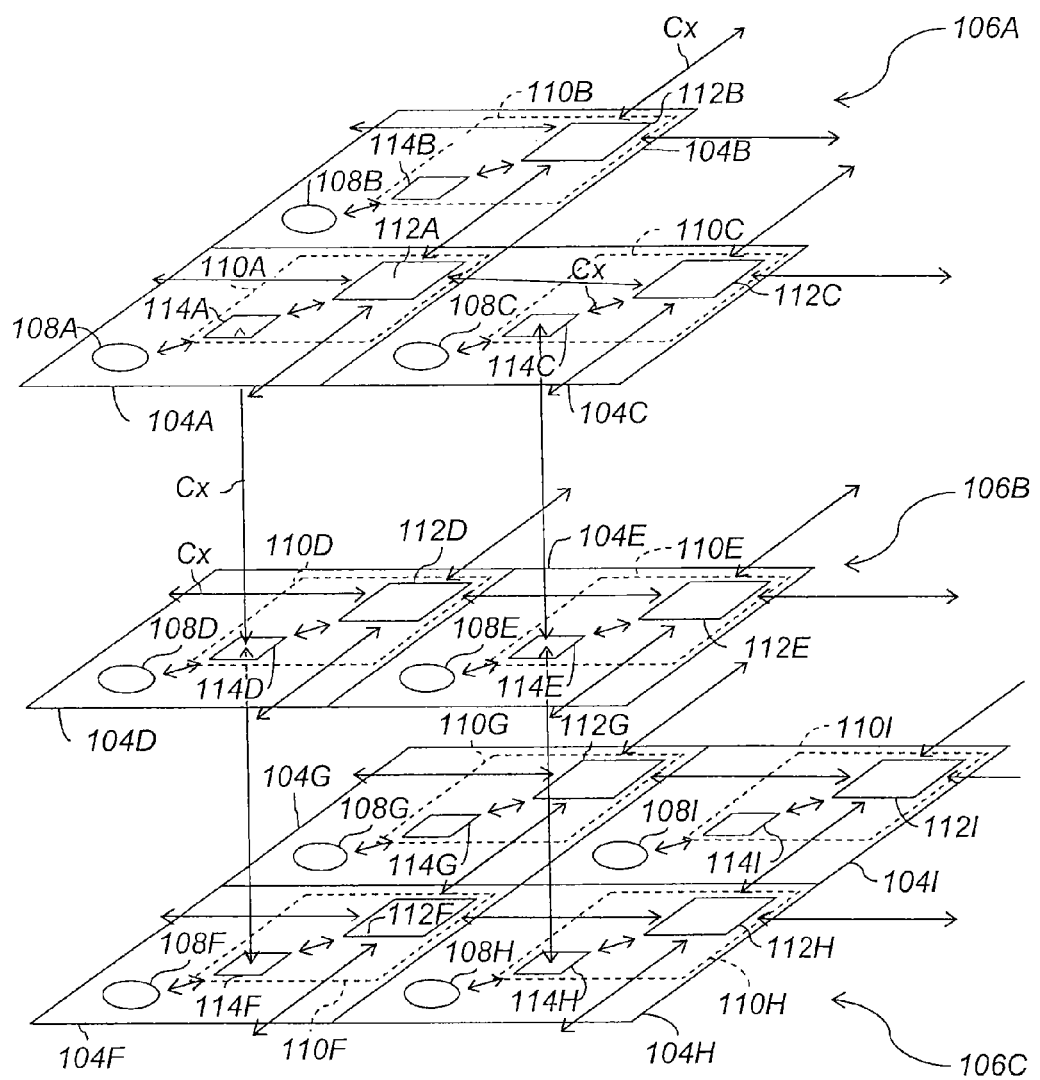
FIG. 3 is a diagram representing functional modules of the electronic chip of FIG. 2 connected to one another.

With reference to FIG. 1, an integrated circuit 10 according to the invention includes a carrier 12 and an electronic chip 14 set in the carrier 12. As explained above, the electronic chip is a small element of semiconducting material in which a given electronic circuit is designed. In the described example the electronic circuit is designed in the form of a Network on Chip such that the electronic chip 14 includes functional modules exchanging data with one another like the nodes in a network. Moreover, in the described example, the electronic chip 14 includes several layers (three in the described example) of functional modules stacked on one another in a direction traditionally called Upper/Lower UL. The functional modules of each layer are positioned relative to one another in relation to two perpendicular directions, generally called North/South NS and West/East WE.

The integrated circuit 10 moreover includes connection pins 16 traversing the carrier 12 and connected to the electronic chip 14. The connection pins are designed to be connected to a printed circuit card (not represented) in order to connect the integrated circuit 10 to the latter.

A part 100 of the electronic chip 14 will now be described in detail.

With reference to FIG. 2, the three layers of the electronic chip as they are shown in part 100 are represented separately from one another. These three layers are referenced respectively 102A, 102B, 102C and include, in part 100, nine functional modules 104A-104I.

More specifically, the first layer 102A (the highest layer in the UL direction) includes the three functional modules 104A, 104B and 104C, the second layer 102B includes the two functional modules 104D and 104E, and the third layer (the lowest layer in the UL direction) includes the four functional modules 104F, 104G, 104H and 104I.

In order to exchange data the electronic chip includes connections called routing connections, connecting the functional modules 104A-104I to one another, as will be explained below, and also to the pins of the electronic chip. In particular, each functional module 104A-104I is connected with other functional modules, preferably, and as is the case in the described example, with neighbouring functional modules. The neighbouring functional modules of a given functional module are the functional modules in contact with it, located either in the same layer or in an adjacent layer. The functional modules will be called North, South, East, West, Upper or Lower, according to their position relative to the given functional module. In the described example the functional modules each includes at most a single neighbour in each direction North, South, East, West, Upper and Lower.

Thus, in the described example, functional module 104A of the first layer 102A includes, in part 100, functional module 104B as its North neighbour, module 104C as its East neighbour and module 104D as its Lower neighbour. Still considering the described example, functional module 104H includes, in part 100, module 104I as its North neighbour, module 104F as its West neighbour and module 104E as its Upper neighbour.

The manner in which the functional modules are connected to one another will now be described in detail.

With reference to FIG. 3, the functional modules of each plane are connected so as to form a network 106A, 106B, 106C of functional modules. In the illustrated example each of the networks 106A, 106B, 106C is a lattice network in which each functional module 104A-104I can be connected to as many as four neighbouring functional modules in its plane (the neighbouring functional modules North, South, East or West). Furthermore, at least a part of the functional modules of each plane are connected to their Lower neighbouring functional module and/or to their Upper neighbouring functional module.

Each functional module 104A-104I firstly includes a single processing unit 108A-108I. Each processing unit 108A-108I is designed to process data which it receives from other processing units and/or to transmit data to other processing units. Processing units 108A-108I are, for example, memory or a processor core.

Each functional module 104A-104I also includes a single routing unit 110A-110I connected to its processing unit 108A-108I. Routing units 110A-110I of functional modules 104A-104I are connected to one another by the routing connections so as to allow a routing of data between the processing units 108A-108I. Thus, each routing connection has a first end connected to a routing unit. The other end is connected to another routing unit or to the processing unit associated with the routing unit connected to its first end, or to another element towards which and/or from which the data must be able to be routed. This other element is, for example, one of the connection pins of the integrated circuit, which enables the electronic chip to transmit and/or receive data. The routing connections have reference Cx in FIG. 3 (in which only a part of the Cx references are shown for the sake of clarity).

Each routing unit 110A-110I is said to be "split" in the sense that it includes two routers, respectively called the first-level router, or router in the plane 112A-112I, and the second-level router or transverse router 114A-114I. These routers are designed to route the data between the routing connections Cx to which they are connected.

The routers in plane 112A-112I are designed to route the data in the plane of their functional module 104A-104I. Each router in the plane 112A-112I is thus connected to the router in the planes of one or more routing units 110A-110I of neighbouring functional modules in the plane of its functional module. Thus, the routers in the plane of each plane form a network, called a network in the plane or first-level network, in which the routers in the plane are connected to one another. The described electronic chip includes three networks in the plane. In each of these networks in the plane the data can be routed between any two routers in the plane by passing only through routers in the plane. Thus, the network in the plane of the first-layer 102A includes the routers in the plane 112A, 112B and 112C. The network in the plane of the second-layer 102B includes the routers in the plane 112D and 112E. The network in the plane of the third-layer 102C includes the routers in the plane 112F, 112G, 112H and 112I.

The transverse routers 114A-114I are designed to route the data transversely to the plane of their functional module 104A-104I (i.e. between the networks 106A, 106B and 106C), and also towards or away from the processing unit 108A-108I of their functional module 104A-104I. Each transverse router 114A-114I is thus firstly connected to the router in the plane 112A-112I and to the processing unit 108A-108I of its functional module 104A-104I. Each transverse router 114A-114I is moreover connected to the routing unit 110A-110I of each of its Upper and/or Lower neighbouring functional module(s) when these exist. In the described example both transverse routers of each of the pairs: 114A and 114D, 114D and 114F, 114C and 114E, 114E and 114H, are thus connected transversely together.

It will be observed that the electronic chip 14 includes linear networks of transverse routers, in each of which the transverse routers are connected to one another, in sequences. In each of these transverse networks the data can be routed between any two transverse routers, passing only through transverse routers. In particular, part 100 of the described electronic chip 14 includes two transverse networks: the first transverse network including the three transverse routers 114A, 114D and 114F, and the second transverse network including the three transverse routers 114C, 114E and 114H.

The routing connections Cx connecting to one another the routers 112A-112I, 114A-114I and the processing units 108A-108I are preferably communication links, also called channels, which convey data from point to point in bidirectional fashion. These bidirectional routing connections Cx are represented in FIG. 3 by two-way arrows.

Also preferably, the processing units 108A-108I exchange data with one another in the form of messages, whereas the routers 112A-112I, 114A-114I are designed to exchange data in data packets (packet switching), where one data packet can contain a message fragment, a full message or even several messages. Also preferably, data packet exchanges are made in wormhole mode, in which the data packets are divided into flits (abbreviation for "flow control digit"). Thus, each processing unit 108A-108I transmits to its routing unit 110A-110I data packets in the form of flits, which are conveyed via other routing units 110A-110I as far as the destination processing unit. The latter reconstitutes the data packets from their flits, and then the messages from the data packets.

Figure 4:
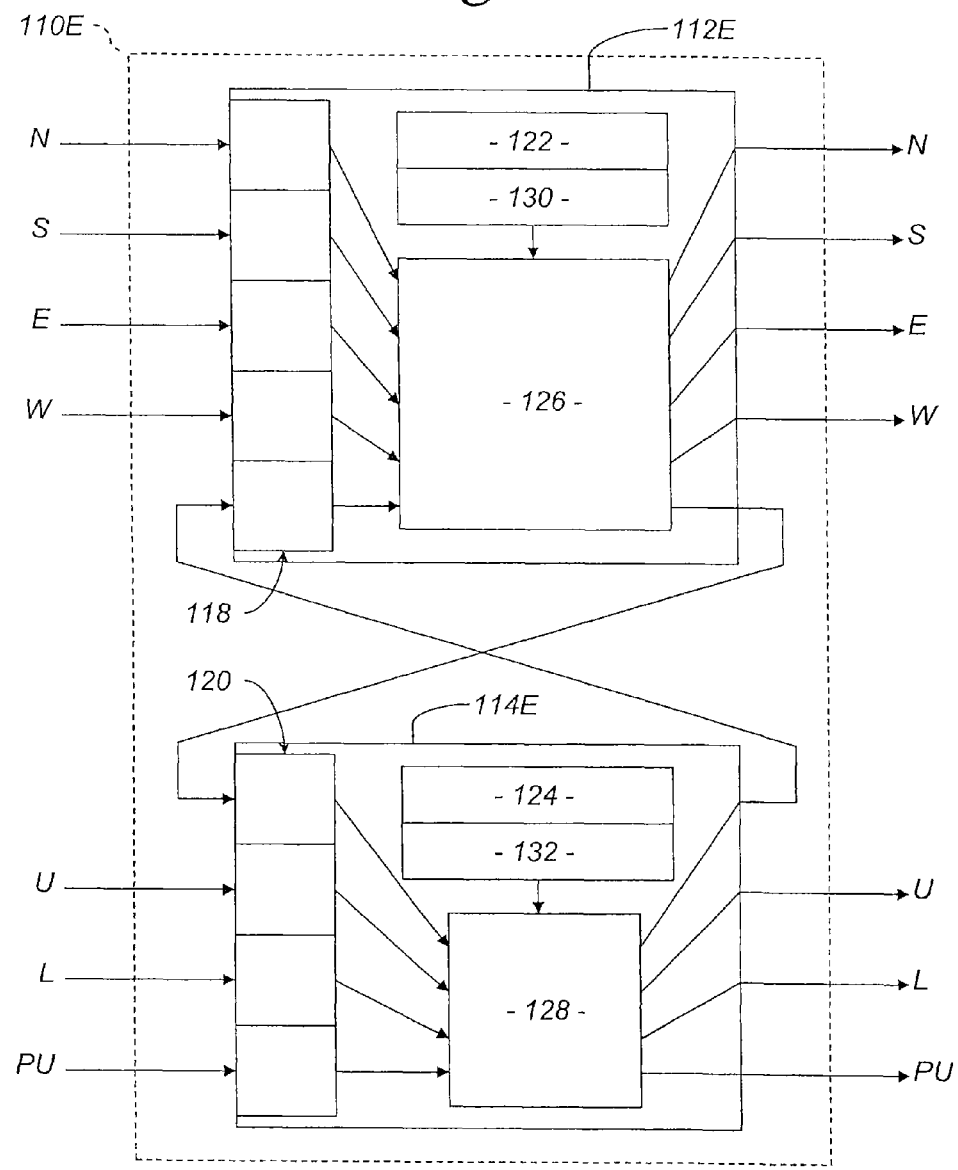
FIG. 4 is a diagram representing a routing unit of a functional module of FIG. 2.

With reference to FIG. 4, the split routing units will now be described in detail, taking the case of a routing unit connected to the corresponding processing unit and to neighbouring functional modules in the six possible directions (North, South, East, West, Upper and Lower, indicated respectively by the letters N, S, E, W, U and L), as, for example, the routing unit 110E of FIG. 3. Each Cx bidirectional routing unit is now represented by an incoming channel and an outgoing channel.

Thus, the router in plane 112E is connected to four incoming and four outgoing channels, for the four directions North, South, East and West. The router in plane 112E is moreover connected to an outgoing channel and an incoming channel in order to exchange with the transverse router 114E.

The transverse router 114E is connected to an incoming channel and an outgoing channel in order to exchange with the router in the plane 112E, with two incoming channels and two outgoing channels in the case of the Upper and Lower directions, and with one incoming channel and one outgoing channel in the case of processing unit 108E.

Each of the two routers 112E, 114E includes, for each incoming channel, an input port 118, 120, in particular to buffer the incoming data.

Each router 112E, 114E also includes a routing computation system 122, 124 to determine the output channel to which to route the buffered data in each input port 118, 120.

Each router 112E, 114E also includes a crossbar 126, 128 to connect selectively each input port 118, 120 to each output channel. In the described example, each router 112E, 114E includes a single crossbar 126, 128, the size of which is therefore equal to the number of input channels by the number of output channels. Thus the crossbar 126 of the router in plane 112E is of size 5×5, whereas the crossbar 128 of the transverse router 114E is of size 4×4.

Each router 112E, 114E also includes a switch allocator system 130, 132 to control the crossbar 126, 128 in order that it connects the input port 118, 120 and the output channel determined by the routing computation system 122, 124.

The advantages of the invention will now be described in detail, using digital data taken from the article "A novel dimensionally-decomposed router for on-chip communication in 3D architectures", by J. Kim et al, published in *ACM SIGARCH Computer architecture news*, vol. 35, pages 138-149, May 2007.

If the routing unit 110E had consisted of a single router the latter would have had to have been connected to seven incoming channels and seven outgoing channels. It would thus have included a crossbar of size 7×7, which generally occupies an area of the order of 17,300 μm$^2$ and consumes the order of 9.4 mW (for a 50% switching activity at 500 MHz). But the crossbar of a router of size 5×5, such as the router in plane 112E, occupies an area of the order of 8,500 µm² and consumes the order of 4.2 mW (for a 50% switching activity at 500 MHz), whereas the crossbar of a router of size 4×4, such as the transverse router 114E, occupies an even smaller area and has an even lower consumption. Thus, the total area of the two 5×5 and 4×4 routers is slightly less than that of a single 7×7 router. Moreover, when both the 5×5 and 4×4 routers are used at the same time the electrical power consumption is slightly less than that of a single 7×7 router. However, as will be explained below, a single one of the two routers is used most of the time at a given moment to route the data through the routing unit, such that the average electrical power consumption of a split routing unit is substantially less than that of a routing unit with a single router.

The other split routing units of the electronic chip 14 described are identical, except that the number of input and output channels can vary according to the number of neighbouring functional modules.

It is clear that an electronic chip such as the one described above allows a performance gain, and in particular a gain in terms of transmission rate and latency, without imposing any particular routing algorithm.

Indeed, when the data is conveyed between the processing units of functional modules the transverse routers of which belong to an identical transverse network, this data traverses only transverse routers. Thus, the use of split routing units is advantageous since the transverse routers are small in size, particularly compared to the size of the single routers which non-split routing units would be.

When the data is conveyed between two functional modules the routers in the plane of which belong to the same network in the plane, this data transverses a transverse router, followed by N routers in the plane (where N equals the number of functional modules traversed), and finally, once again, a transverse router. If the routing units included only a single router, the data would traverse N of these single routers. Thus, as soon as N is high, the use of split routing units becomes advantageous since the traversal of the two additional transverse routers is compensated by the fact that the routers in the plane are small in size, particularly compared to the size of the single routers which non-split routing units would be.

Finally, when data is conveyed between two functional modules of different layers the transverse routers of which do not belong to the same transverse network this data traverses M+1 transverse routers (where M equals the number of layers separating the two functional modules), followed by N routers in the plane (where N equals the number of functional modules traversed in the final layer) and finally a transverse router. If the routing units included only a single router, the data would traverse M+N of these single routers. Thus, as soon as M+N is high the use of split routing units becomes advantageous since the traversal of the two additional transverse routers is compensated by the fact that the routers in the plane and the transverse routers are small in size, particularly compared to the size of the single routers which non-split routing units would be.

It will also be noted that the invention is not restricted to the previously described embodiment. Indeed, it will be clear to the skilled man in the art that various modifications can be made to the embodiment described above, in the light of the teaching which has just been disclosed to him.

In particular, the electronic chip may include functional modules the routing unit of which is not split, i.e. including a single router. In particular, non-split routing units are preferably envisaged when the functional module does not include Upper and Lower neighbours, or at least when it is not connected to these.

Moreover, the processing unit of the functional modules the routing unit of which is split could be connected to the router in the plane instead of the transverse router. By this means, in the case of a functional module connected to all its neighbours, a router in the plane which is connected to six routing connections (four neighbouring functional modules in the plane, the processing unit and the transverse router), and one transverse router connected to three routing connections (two functional modules in the upper and lower planes, and the router in the plane), would be obtained.

Moreover, the geometry of the networks of functional modules in each layer is not restricted to a lattice geometry. For example, this geometry could be replaced by one of the following geometries: chordal ring, fat tree, torus or folded torus. It will be remarked that each network in the plane of routers in the plane would then adopt this geometry.

Furthermore, the electronic chip is not necessarily encapsulated in a carrier to form an integrated circuit. Indeed, the electronic chip could be integrated directly into an electronic circuit such as a printed circuit card.

In the following claims the terms used must not be interpreted as restricting the claims to the embodiments set out in the present description, but must be interpreted in such a way as to include in them all the equivalents which the claims are intended to cover due to the way in which they are worded, and the prediction of which is within the grasp of the skilled man in the art by applying his general knowledge to the use of the teaching which has just been disclosed to him.

The invention claimed is:

1. An electronic chip including functional modules, each including a single processing unit and a single routing unit connected to one another, and connections, called routing connections, each of which has at least one end connected to the routing unit of a functional module, where the routing connections connect between themselves the routing units of the functional modules so as to allow a routing of data between the processing units of the functional modules, wherein the routing unit of at least one functional module is a split routing unit, including two routers, respectively called a first-level router and a second-level router, which are bi-directionally connected one to another, and where the first-level router is connected to at least two routing connections, and where the second-level router is connected to the processing unit of the at least one functional module and connected to at least one other routing connection.

2. The electronic chip according to claim 1, including several functional modules, each of which has a split routing unit.

3. The electronic chip according to claim 2, wherein the first-level routers form at least one network, called a first-level network, in which the first-level routers are connected to one another.

4. The electronic chip according to claim 3, wherein the first-level routers form several first-level networks, the electronic chip including at least one pair of split routing units the first-level routers of which belong to different first-level networks, and the respective second-level routers of which are connected to one another.

5. The electronic chip according to any of the claims 2 to 4, wherein the second-level routers form at least one network, called a second-level network, in which the second-level routers are connected to one another.

6. The electronic chip according to claim 3, including several layers of functional modules.

7. The electronic chip according to claim 6, wherein each layer includes a separate first-level network.

8. The electronic chip according to claim 7, including at least one pair of split routing units, the first-level routers of which belong to first-level networks of different layers, and the respective second-level routers of which are connected to one another.

9. The electronic chip according to claim 8, wherein each first-level network is a lattice network and wherein several functional modules have a split routing unit and have:
- their first-level router connected only to their second-level router and to four first-level routers of four neighbouring functional modules in their layer, and
- their second-level router connected only to their first-level router, to their processing unit, and to two second-level routers of two neighbouring functional modules, respectively, of a layer above and of a layer below their layer.

10. An integrated circuit including a carrier, the electronic chip according to claim 1 set in the carrier, and connection pins traversing the carrier and connected to the electronic chip.

11. The electronic chip according to claim 1, wherein the split routing unit includes only the first-level router and the second-level router, the first-level router including a crossbar selectively connecting the second-level router, a first routing connection, and a second routing connection to each other as input and output ports, and the second-level router including a crossbar selectively connecting the first-level router, the processing unit of the respective functional module, and a third routing connection to each other as input and output ports.

* * * * *